(12) United States Patent  
Huang et al.

(10) Patent No.: US 8,509,039 B1
(45) Date of Patent: Aug. 13, 2013

(54) THERMALLY-ASSISTED RECORDING (TAR) DISK WITH LOW THERMAL-CONDUCTIVITY UNDERLAYER

(75) Inventors: Lidu Huang, Danville, CA (US); Andrew Thomas McCallum, San Jose, CA (US); Simone Pisana, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/535,499

(22) Filed: Jun. 28, 2012

(51) Int. Cl.
*G11B 7/085* (2006.01)
*G11B 11/00* (2006.01)

(52) U.S. Cl.
USPC .................. 369/30.03; 369/13.14; 369/13.02

(58) Field of Classification Search
None
See application file for complete search history.

(56) References Cited

U.S. PATENT DOCUMENTS

| | | | |
|---|---|---|---|
| 4,857,373 A | 8/1989 | Carcia et al. | |
| 6,602,620 B1 | 8/2003 | Kikitsu et al. | |
| 7,041,398 B2 | 5/2006 | Doushita | |
| 7,361,420 B2 | 4/2008 | Yasui et al. | |
| 8,089,829 B2 * | 1/2012 | Akagi et al. | 369/13.01 |
| 8,351,309 B2 * | 1/2013 | Kanbe et al. | 369/30.03 |
| 2004/0017768 A1 | 1/2004 | Hibino et al. | |
| 2006/0028974 A1 | 2/2006 | Mori et al. | |
| 2011/0205862 A1 | 8/2011 | Kanbe et al. | |
| 2011/0235479 A1 | 9/2011 | Kanbe et al. | |

FOREIGN PATENT DOCUMENTS

| | | |
|---|---|---|
| WO | 2010109822 A1 | 9/2010 |
| WO | 2011096472 A1 | 8/2011 |

* cited by examiner

*Primary Examiner* — Muhammad N Edun
(74) *Attorney, Agent, or Firm* — Thomas R. Berthold

(57) ABSTRACT

A thermally-assisted recording (TAR) disk has an improved insulating layer beneath the chemically-ordered FePt (or CoPt) alloy recording layer. The insulating layer is a solid substitution crystalline alloy MgXO, where the element X is selected from nickel (Ni) and cobalt (Co). The composition of the MgXO crystalline solid substitutional alloy is of the form $(Mg_{(100-y)}X_y)O$ where y is between 10 and 90, and more preferably between 20 and 80. An optional layer of crystalline "pure" MgO may be located between the MgXO layer and the FePt recording layer and in contact with the recording layer, or between an underlayer and the MgXO layer.

20 Claims, 5 Drawing Sheets

THERMALLY-ASSISTED RECORDING (TAR) DISK WITH LOW THERMAL-CONDUCTIVITY UNDERLAYER

TECHNICAL FIELD

This invention relates generally to a thermally-assisted recording (TAR) disk drive, in which data are written while the magnetic recording layer on the disk is at an elevated temperature, and more specifically to an improved TAR disk.

BACKGROUND OF THE INVENTION

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is thermally-assisted recording (TAR), also called heat-assisted magnetic recording (HAMR), wherein high-$K_u$ magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed TAR systems, the magnetic recording material is heated to near or above its Curie temperature. The recorded data is then read back at ambient temperature by a conventional magnetoresistive read head. TAR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed TAR disk drive uses a "small-area" heater to direct heat to just the area of the data track where data is to be written by the write head. The most common type of small-area TAR disk drive uses a laser source and an optical waveguide with a near-field transducer (NFT). A "near-field" transducer refers to "near-field optics", wherein the passage of light is through an element with subwavelength features and the light is coupled to a second element, such as a substrate like a magnetic recording medium, located a subwavelength distance from the first element. The NFT is typically located at the air-bearing surface (ABS) of the air-bearing slider that also supports the read/write head and rides or "flies" above the disk surface.

One type of proposed high-$K_u$ TAR media with perpendicular magnetic anisotropy is an alloy of FePt or CoPt alloy chemically-ordered in the $L1_0$ phase. The chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The FePt and CoPt alloys require deposition at high temperature or subsequent high-temperature annealing to achieve the desired chemical ordering to the $L1_0$ phase. An insulating crystalline MgO layer is typically located below the FePt layer to enhance the growth of the FePt material and to confine the heat from the NFT to the FePt.

However, a problem associated with a TAR disk is optimization of the amount of heat to the FePt recording layer. If the thermal conductivity of the MgO insulating layer is too high the heat from the NFT will be distributed too rapidly, which will require more laser power to heat the FePt material. If the thermal conductivity of the MgO insulating layer is too low the heat from the NFT will be confined to the recording layer and will spread laterally through the recording layer. This is undesirable because the lateral spreading of the heat may cause recorded data in adjacent data tracks to be overwritten. Thus there is a trade-off in the design of a TAR disk to optimize the properties of the insulating layer and optional heat sink layer to both minimize the amount of heat required and to prevent lateral spreading of the heat through the recording layer.

What is needed is an improved TAR disk that allows for control and optimization of heat to the recording layer.

SUMMARY OF THE INVENTION

The invention relates to a TAR disk with an improved insulating layer beneath the chemically-ordered FePt (or CoPt) alloy recording layer. The insulating layer is a solid substitution crystalline alloy MgXO, where the element X is selected from nickel (Ni) and cobalt (Co). The MgXO crystalline alloy has a significantly lower thermal conductivity than the prior art MgO crystalline alloy. The composition of the MgXO crystalline solid substitutional alloy is of the form $(Mg_{(100-y)}X_y)O$ where y is between 10 and 90, and more preferably between 20 and 80. If the thermal conductivity of the MgXO layer is selected to have one-half the thermal conductivity of MgO (i.e., essentially twice as insulating), then approximately the same amount of laser power would be required to heat the FePt layer sufficient for writing as would be required to heat the FePt layer with a MgO layer twice as thick. Because the MgXO crystalline lattice should substantially match the crystalline lattice of MgO to assure proper growth of the FePt, it is important that the element X added to the solid substitutional crystalline alloy not significantly alter the lattice parameter. Both NiO and CoO have a rock-salt crystalline structure with lattice parameters that substantially match that of MgO, and thus the MgNiO or MgCoO insulating layer will assure proper growth of the FePt recording layer. The TAR disk of the invention may also include an optional layer of crystalline "pure" MgO in addition to the MgXO layer. This insulating MgO layer may be located between the MgXO layer and the FePt recording layer and in contact with the recording layer, or between an underlayer and the MgXO layer. The optional MgO layer may be used to improve the growth of the material of the layer above it, either the FePt recording layer or the MgXO layer. The relative thickness of the MgO and MgXO layers may be selected to optimize the thermal conductivity of the two layers.

For a fuller understanding of the nature and advantages of the present invention, reference should be made to the following detailed description taken together with the accompanying figures.

DETAILED DESCRIPTION OF THE INVENTION

Figure 1:
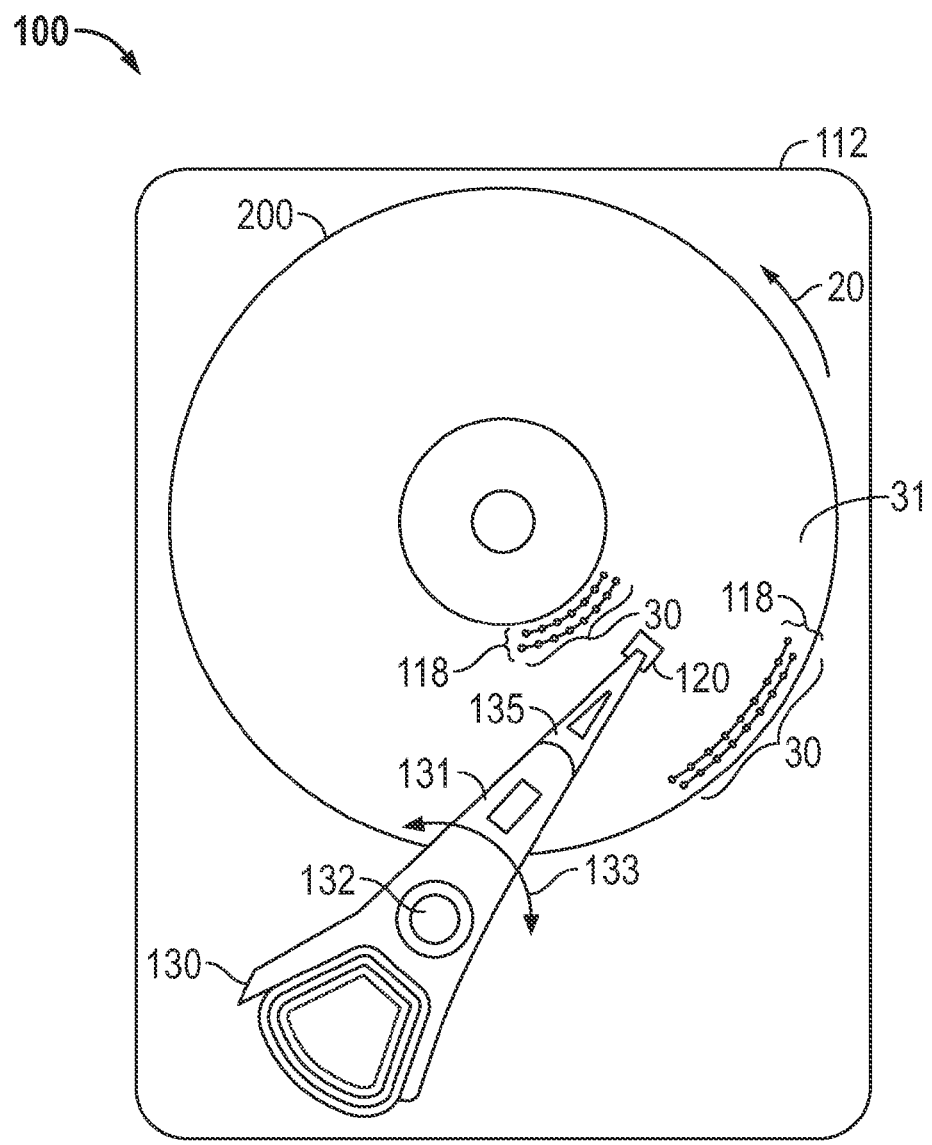
FIG. 1 is a top view of a thermally-assisted recording (TAR) disk drive as proposed in the prior art.

FIG. 1 is a top view of a thermally-assisted recording (TAR) disk drive 100 as proposed in the prior art. The TAR disk drive 100 is depicted with a disk 200 with magnetic recording layer 31 patterned into discrete data islands 30 of magnetizable material arranged in radially-spaced circular tracks 118, with only a few islands 30 and representative tracks 118 near the inner and outer diameters of disk 200 being shown. However, instead of the bit-patterned-media (BPM) shown with discrete data islands 30 in FIG. 1, the TAR disk drive may instead use disks with a conventional continuous magnetic recording layer 31 of magnetizable material.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the TAR head (not shown), which includes a magnetoresistive read head, an inductive write head, the near-field transducer (NFT), optical waveguide and optionally the laser. As the disk 200 rotates in the direction of arrow 20, the movement of actuator 130 allows the TAR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and TAR head associated with each surface of each disk.

Figure 2:
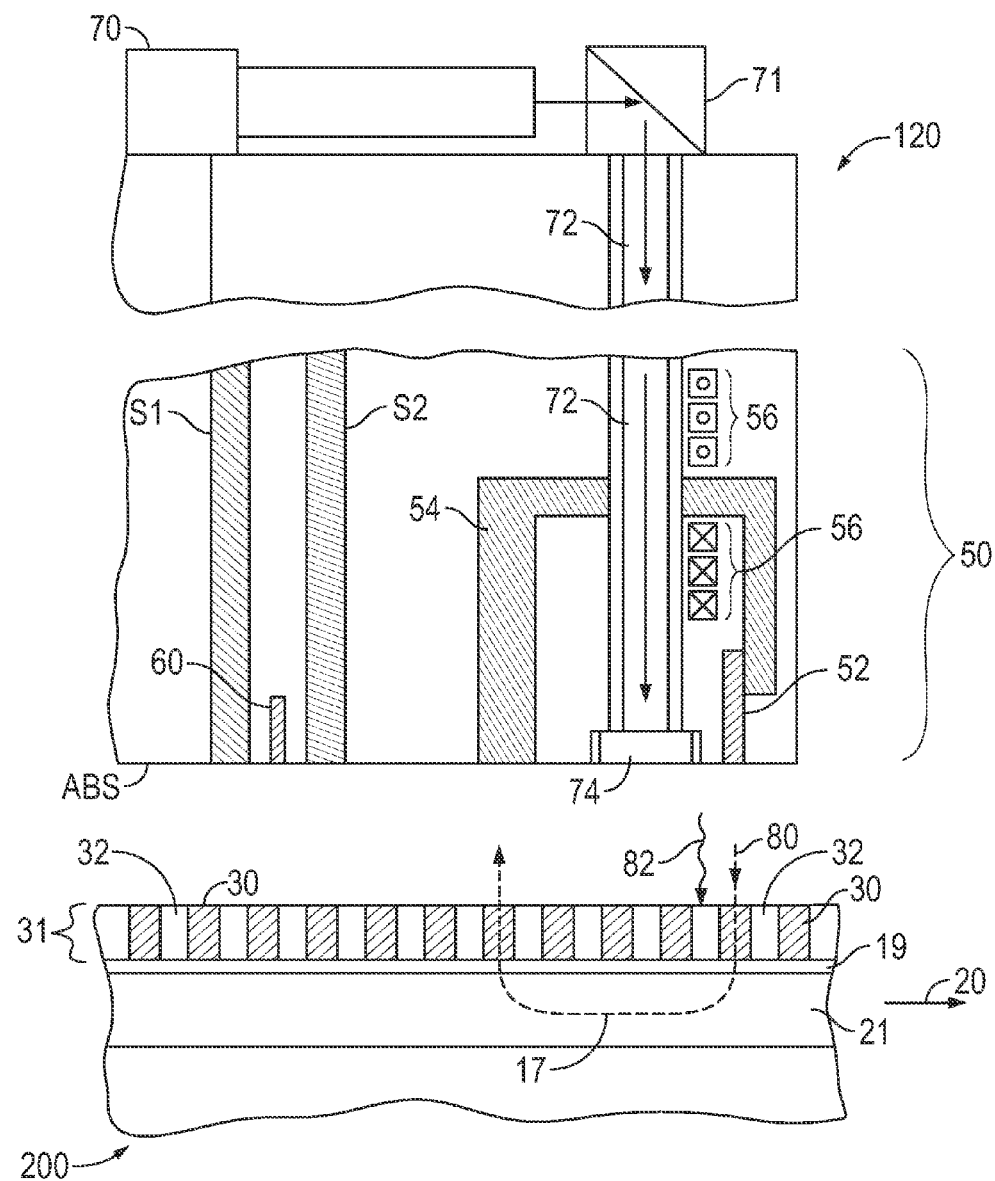
FIG. 2 depicts a sectional view, not drawn to scale because of the difficulty in showing the very small features, of an air-bearing slider for use in TAR disk drive and a portion of a bit-patterned-media (BPM) TAR disk according to the prior art.

FIG. 2 depicts a sectional view, not drawn to scale because of the difficulty in showing the very small features, of air-bearing slider 120 for use in TAR disk drive 100 and a portion of a BPM TAR disk 200. The air-bearing slider 120 has an air-bearing surface (ABS) that faces the disk 200 and supports the write head 50 (with yoke 54 and write pole 52), read head 60, and magnetically permeable read head shields S1 and S2. The slider 120 also supports a laser 70, mirror 71, optical channel or waveguide 72 and NFT 74, which has its output at the ABS. While the slider 120 is depicted as supporting a mirror 71 for directing the laser radiation from laser 70 into waveguide 72, it is known to use a grating coupler coupled to the waveguide, as described for example in US 20090310459 A1. In another approach, the emitted laser light from a laser diode is directly coupled to the waveguide 72.

In the TAR disk 200, the BPM recording layer 31 includes discrete data islands 30 separated by nonmagnetic regions 32. The recording layer 31 is high-$K_u$ material, typically an alloy of FePt or CoPt alloy chemically-ordered in the $L1_0$ phase. An insulating layer 19, typically a layer of MgO, which has a cubic "rock-salt" crystalline structure, is located below the recording layer 31 to help control the heat flow so that heat is not distributed too rapidly and to also enhance the crystalline formation of the FePt material. An underlayer 21 is located between the disk substrate and the insulating layer 19. The underlayer 21 may include a seed layer for the MgO layer 19, an optional heat sink layer and an optional soft underlayer (SUL).

When write-current is directed through coil 56, the write pole 52 directs magnetic flux to the data islands 30, as represented by arrow 80 directed to one of the data islands 30. The dashed line 17 with arrows shows the flux return path back to the return pole 54. The NFT 74 directs near-field radiation, as represented by wavy arrow 82, to the data islands 30 as the TAR disk 200 moves in the direction 20 relative to the slider 120. NFTs typically use a low-loss metal (e.g., Au, Ag, Al or Cu) shaped in such a way to concentrate surface charge motion at a surface feature shaped as a primary apex or tip. Oscillating tip charge creates an intense near-field pattern. Sometimes, the metal structure can create resonant charge motion, called surface plasmons or local plasmons, to further increase intensity. The electromagnetic field of the oscillating tip charge then gives rise to optical output in the near field, which is directed to the data islands on the disk. The electric charge oscillations in the NFT heat the data islands 30 at the same time the data islands are exposed to the write field from the write pole 52. This raises the temperature of the magnetic recording material in the data islands to near or above its Curie temperature to thereby lower the coercivity of the material and enable the magnetization of the data islands to be switched by the write field.

One of the problems associated with a TAR disk like disk 200 is optimization of the amount of heat to the recording layer 31. If the thermal conductivity of insulating layer 19 is too high the heat from the NFT 74 will be distributed too rapidly, which will require more laser power to heat the recording layer 31. If the thermal conductivity of insulating layer 19 is too low the heat from the NFT 74 will be confined to the recording layer 31 and will spread laterally through the recording layer 31. This is undesirable, especially with continuous media, because the lateral spreading of the heat may cause recorded data in adjacent data tracks to be overwritten. Thus there is a trade-off in the design of a TAR disk to optimize the properties of the insulating layer and optional heat sink layer to both minimize the amount of heat required and to prevent lateral spreading of the heat through the recording layer.

Figure 3:
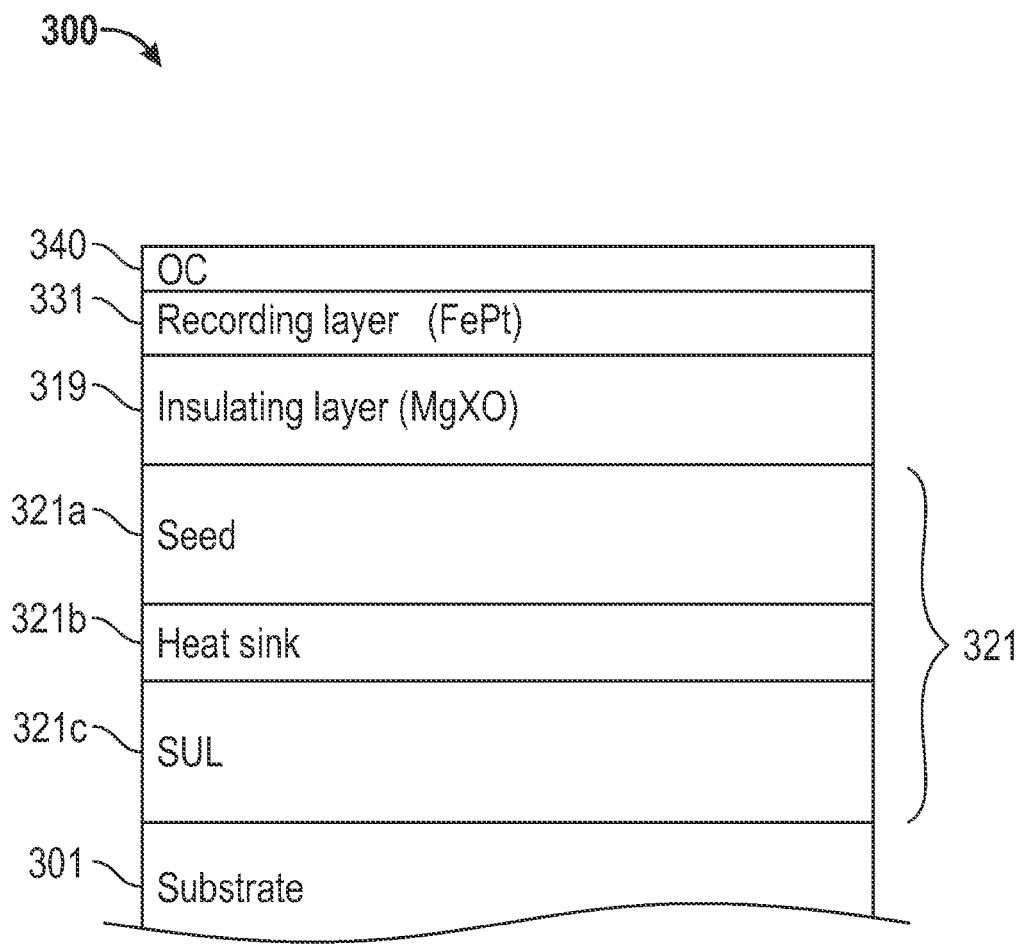
FIG. 3 is a cross-section of a TAR disk according to the invention.

FIG. 3 is a cross section of a TAR disk 300 according to the invention. The hard disk substrate 301 is preferably any commercially available glass substrate, but may also be a conventional aluminum alloy with a NiP surface coating, or an alternative substrate, such as silicon or silicon-carbide. An insulating layer 319 is located below the recording layer 331 and an underlayer 321 is located between the substrate 301 and insulating layer 319. A protective overcoat (OC) 340 is deposited on the recording layer 331, preferably to a thickness between about 2-5 nm. The OC 340 may be sputter-deposited amorphous carbon, like diamond-like carbon (DLC), which may also be hydrogenated and/or nitrogenated. Other materials that may be used for the OC 340 include carbides such as silicon carbides and boron carbides; nitrides such as silicon nitrides ($SiN_x$), titanium nitrides, and boron nitrides; metal oxides, such as $TiO_2$, $ZrO_2$, $Al_2O_3$, $Cr_2O_3$, $Ta_2O_5$ and $ZrO_2$—$Y_2O_3$; and mixtures of these materials.

In the TAR disk of this invention the recording layer 331 is a chemically-ordered FePt alloy (or CoPt alloy) with perpendicular magnetic anisotropy. The FePt layer is typically between about 3-10 nm thick. Chemically-ordered alloys of FePt (and CoPt) ordered in $L1_0$ are known for their high magneto-crystalline anisotropy and magnetization, properties that are desirable for high-density magnetic recording materials. The chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The chemically-ordered FePt alloy may be the generally equiatomic binary FePt alloy, but may also be a pseudo-binary alloy based on the FePt $L1_0$ phase, e.g., (Fe(y)Pt(100-y))—Z, where y is between about 45 and 55 atomic percent and the element Z may be Ni, Au, Cu, Pd or Ag and is present in the range of between about 0% to about 20% atomic percent. While the pseudo-binary alloy in general has similarly high anisotropy as the binary alloy FePt, it allows additional control over the magnetic and other properties of the recording layer. For example, the addition of Cu reduces the Curie temperature by about 100-150 K. While the method will be described for media with a FePt recording layer, the method is also fully applicable to media with a CoPt (or a pseudo-binary CoPt—Z alloy based on the CoPt $L_{10}$ phase) recording layer. The recording layer 331 may also optionally include one or more segregants, such as one or more of $SiO_2$, C, B, BN and a silicon nitride (SiNx) that form between the FePt (or CoPt) grains to reduce the grain size.

The FePt recording layer 331 may sputter deposited onto the insulating layer 319 while the disk substrate 301 is maintained at an elevated temperature greater than about 300° C. At this temperature the FePt alloy becomes fully chemically ordered and a subsequent high-temperature annealing is not required. The FePt may be sputter deposited from a single composite target having generally equal atomic amounts of Fe and Pt or co-sputtered from separate targets. As an alternative method for depositing the FePt layer, sequential alternating layers of Fe and Pt can be deposited while the substrate is heated by sputter depositing from separate Fe and Pt targets, using a shutter to alternately cover the Fe and Pt targets, with each Fe and Pt layer having a thickness in the range of about 0.15 nm to 0.25 nm to achieve a total thickness of about 3 to 10 nm for layer 331. Instead of deposition while the substrate is heated, the FePt may be deposited as described above but with the substrate at room temperature, followed by high temperature annealing to achieve the chemical ordering.

Figure 4:
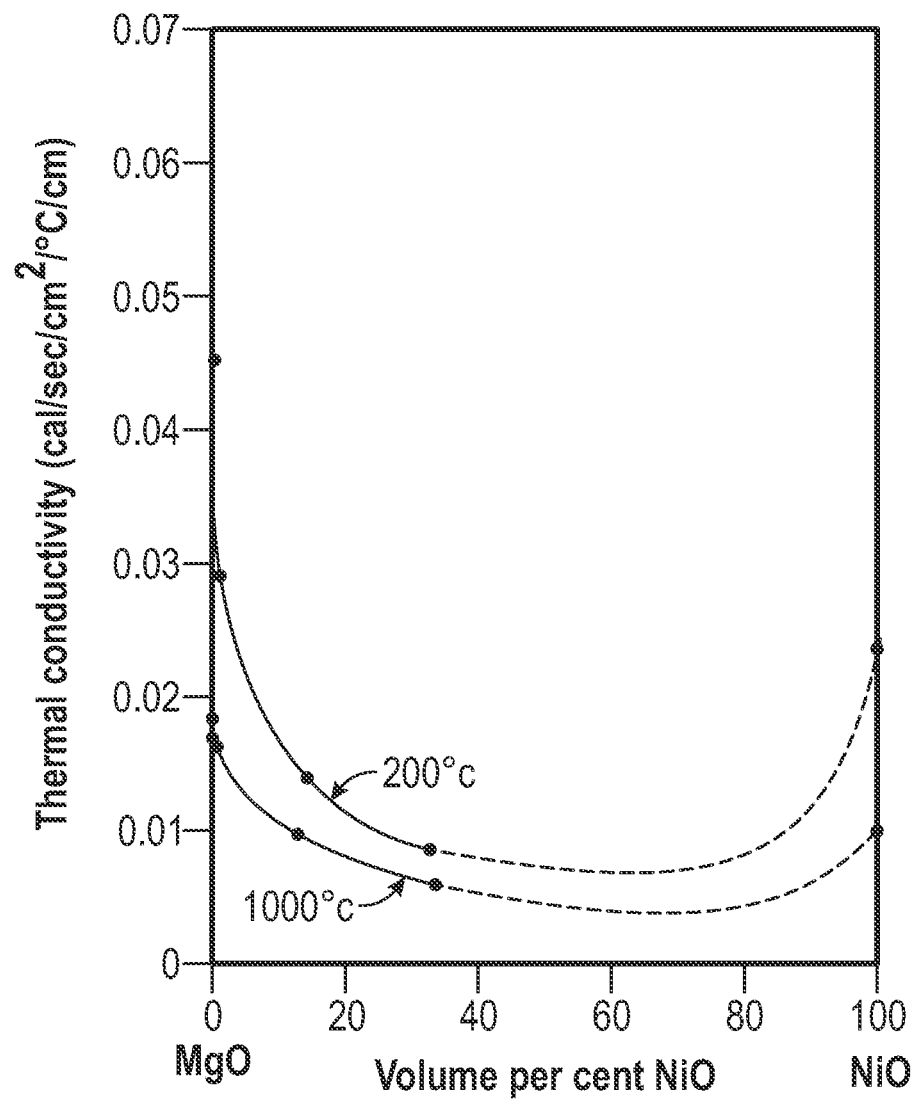
FIG. 4 is a graph of thermal conductivity of the bulk solid solution system of MgO—NiO as a function of volume percent NiO.

In this invention the insulating layer 319 below recording layer 331 is a solid substitution crystalline alloy MgXO, where the element X is selected from nickel (Ni) and cobalt (Co), with a thickness between about 5-15 nm. The MgXO crystalline alloy has a significantly lower thermal conductivity than the prior art MgO crystalline alloy. FIG. 4 (reproduced from *Introduction to Ceramics, 2nd Edition*, W. David Kingery, 1976) shows the thermal conductivity of the bulk solid solution system of MgO—NiO as a function of volume percent NiO. As part of the development of this invention it has been determined from experiments with thin films of MgO that the thermal conductivity of thin (in the range of approximately 2-20 nm) MgO films is generally the same as the thermal conductivity of bulk MgO at 1000° C. Thus one can conclude that the thermal conductivity of thin MgO—NiO films is generally the same as the thermal conductivity of bulk MgO—NiO at 1000° C., which is shown in FIG. 4. From FIG. 4, the thermal conductivity of MgO can be significantly reduced if Ni forms between 10 and 90 percent of the total of Ni and Mg, and preferably between 20 and 80 percent. Thus, compared to the thermal conductivity of a thin MgO film, the thermal conductivity of a thin MgO—NiO film will be about one-fourth for about 60 volume percent NiO (corresponding to 30 atomic percent Ni and 20 atomic percent Mg in the MgNiO, or $Mg_{20}Ni_{30}O_{50}$), and about one-half for about 20 volume percent NiO ($Mg_{40}Ni_{10}O_{50}$). Thus the composition of the MgXO crystalline solid substitutional alloy is of the form $(Mg_{(100-y)}X_y)O$ where y is between 10 and 90, and more preferably between 20 and 80.

If the thermal conductivity of the MgXO layer is selected to have one-half the thermal conductivity of MgO (i.e., essentially twice as insulating), then approximately the same amount of laser power would be required to heat the FePt layer sufficient for writing as would be required to heat the FePt layer with a MgO layer twice as thick. Also, modeling results show that for an insulating crystalline layer of 9 nm thickness beneath the FePt layer, a 17% reduction in laser power can be achieved if the insulating layer is (MgNi)O instead of MgO. Also, the thickness and specific composition of the $(Mg_{(100-y)}X_y)O$ material can be selected to achieve the desired level of thermal conductivity.

Because the MgXO crystalline lattice should substantially match the crystalline lattice of MgO to assure proper growth of the FePt, it is important that the element X added to the solid substitutional crystalline alloy not significantly alter the lattice parameter. Both NiO and CoO have a rock-salt crystalline structure with lattice parameters that substantially match that of MgO. The lattice parameters of MgO, NiO and CoO are 4.21 Å, 4.18 Å and 4.26 Å, respectively. Additionally the most stable oxide structure for both Ni and Co is the rock-salt crystalline structure, i.e., NiO and CoO, respectively. This assures that the MgXO has a rock-salt crystalline structure and not a mixture of different oxides with stable structures other than the rock-salt crystalline structure. US published patent applications US 20110235479 A1 and US 20110205862 A1 describe TAR media with an additional element added to MgO, not for altering its thermal conductivity but for reducing its grain size. The element added to the MgO causes the grains of the FePt material grown on the MgO with the added element to also be smaller. The elements that can be added are Al, Si, Ti, V, Cr, Mn, Zr and B (US 20110235479 A1) and Nb, Mo, Ru, Ta and W (US 20110205862 A1). However, none of these elements forms its stable oxide with a single oxygen atom. The stable oxide for each of these elements is a structure other than the rock-salt crystalline structure, for example $SiO_2$ and $B_2O_3$ which are amorphous, $Al_2O_3$ and $Cr_2O_3$ which form a corundum trigonal structure, and $TiO_2$, $MoO_2$ and $RuO_2$ which form a rutile tetragonal structure.

The underlayer 321 includes a seed layer 321a below and in contact with the insulating MgXO layer 319 to enhance the crystalline growth of the MgXO material. The preferred seed layer 321a material is a NiTa alloy with a thickness in the range of about 5-100 nm. NiW may also function as a suitable seed layer.

The underlayer 321 may also include an optional heat sink layer 321b. Heat sink layer 321b may be formed of a material that is a good thermal conductor, like Cu, Au, Ag or other suitable metals or metal alloys. Heat sink layer 321b may be necessary to facilitate the transfer of heat away from recording layer 331 to prevent spreading of heat to regions of the recording layer adjacent to where data is desired to be written, thus preventing overwriting of data in adjacent data tracks.

The underlayer 321 may also include an optional soft underlayer (SUL) 321c of magnetically permeable material that serves as a flux return path for the magnetic flux from the write pole, as depicted by dashed line 17 in FIG. 2. The SUL 321c may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL 321c may also be a laminated or multilayered SUL formed of multiple soft magnetic films separated by nonmagnetic films, such as electrically conductive films of Al or CoCr. The SUL 321c may also be a laminated or multilayered SUL formed of multiple soft magnetic films separated by interlayer films that mediate an antiferromagnetic coupling, such as Ru, Ir, or Cr or alloys thereof. The SUL 321c may have a thickness in the range of about 5 to 50 nm.

Figure 5:
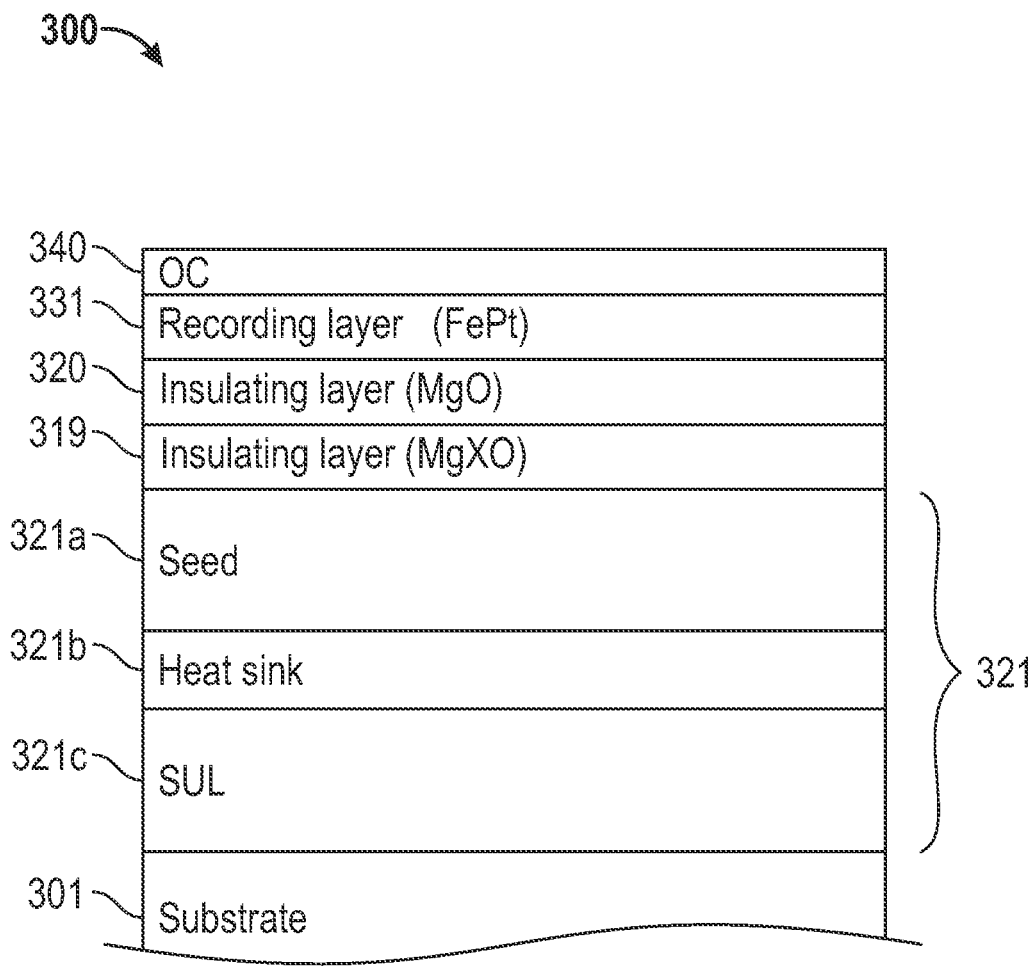
FIG. 5 is a cross-section of an alternative embodiment of the TAR disk according to the invention.

The TAR disk of the invention may also include an optional layer of crystalline "pure" MgO in addition to the MgXO layer. This insulating MgO layer 320 may be located between the MgXO layer 319 and the recording layer 331 and in contact with the recording layer 331, as shown in FIG. 5, or between underlayer 321 and MgXO layer 319. The MgO layer may be used to improve the growth of the material of the layer above it, either the FePt recording layer or the MgXO layer. The relative thickness of the MgO and MgXO layers may be selected to optimize the thermal conductivity of the two layers.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A thermally-assisted recording (TAR) disk comprising:
   a substrate;
   an underlayer on the substrate;
   a layer of a crystalline solid substitutional alloy of MgXO on the underlayer, where X is selected from Ni and Co; and
   a magnetic recording layer comprising a chemically-ordered alloy selected from FePt, and CoPt on the MgXO layer.

2. The disk of claim 1 wherein the MgXO has a composition of the form $(Mg_{(100-y)}X_y)O$, where y is between 10 and 90.

3. The disk of claim 2 wherein X is Ni and y is between 20 and 80.

4. The disk of claim 1 further comprising a layer consisting of crystalline MgO between the MgXO layer and the magnetic recording layer, wherein the MgO layer is in contact with the MgOX layer and the magnetic recording layer is in contact with the MgO layer.

5. The disk of claim 1 wherein the magnetic recording layer is in contact with the MgXO layer and further comprising a layer consisting of crystalline MgO between the underlayer and the MgXO layer, wherein the MgXO layer is in contact with the MgO layer.

6. The disk of claim 1 wherein the underlayer comprises a seed layer for growth of the MgXO layer and wherein the MgXO layer is in contact with the seed layer.

7. The disk of claim 6 wherein the seed layer comprises a layer of a NiTa alloy.

8. The disk of claim 1 wherein the chemically-ordered alloy of the magnetic recording layer includes an element selected from the group consisting of Ni, Au, Cu, Pd and Ag.

9. The disk of claim 1 wherein the chemically-ordered alloy of the magnetic recording layer consists of the generally equiatomic binary FePt alloy.

10. The disk of claim 1 wherein the chemically-ordered alloy of the magnetic recording layer has a composition of the form FePt—Z, wherein the element Z is selected from the group consisting of Ni, Au, Cu, Pd and Ag.

11. The disk of claim 1 wherein the magnetic recording layer further comprises one or more segregants selected from $SiO_2$, C, B, BN and a silicon nitride.

12. The disk of claim 1 wherein the underlayer comprises a layer of magnetically permeable material selected from alloys of CoNiFe, FeCoB, CoCuFe, NiFe, FeAlSi, FeTaN, FeN, FeTaC, CoTaZr, CoFeTaZr, CoFeB, and CoZrNb.

13. The disk of claim 1 wherein the underlayer comprises a heat sink layer.

14. The disk of claim 1 wherein the magnetic recording layer is patterned into discrete data islands of magnetizable material.

15. A thermally-assisted recording (TAR) magnetic recording disk drive comprising:
    the TAR disk of claim 1;
    a write head for applying a magnetic field to the magnetic recording layer;
    an optical channel and near-field transducer for directing radiation to the magnetic recording layer; and
    a read head for reading written data from the magnetic recording layer.

16. A thermally-assisted recording (TAR) disk comprising:
    a substrate;
    an insulating layer of a crystalline solid substitutional alloy having a composition of the form $(Mg_{(100-y)}Ni_y)O$, where y is between 20 and 80;
    a seed layer between the substrate and the insulating layer and in contact with the insulating layer;
    a magnetic recording layer comprising a chemically-ordered FePt alloy on and in contact with the insulating layer.

17. The disk of claim 16 further comprising a layer consisting of crystalline MgO between the insulating layer and the magnetic recording layer, wherein the MgO layer is in contact with the insulating layer and the magnetic recording layer is in contact with the MgO layer.

18. The disk of claim 16 wherein the magnetic recording layer is in contact with the insulating layer and further comprising a layer consisting of crystalline MgO between the substrate and the insulating layer, wherein the insulating layer is in contact with the MgO layer.

19. The disk of claim 16 wherein the chemically-ordered alloy of the magnetic recording layer is selected from the equiatomic binary FePt alloy and a pseudo-binary alloy having the formula (Fe(y)Pt(100-y))—Z, where y is between about 45 and 55 atomic percent and the element Z may be Ni, Au, Cu, Pd or Ag and is present in the range of between about 0% to about 20% atomic percent.

20. The disk of claim 16 wherein the magnetic recording layer further comprises one or more segregants selected from $SiO_2$, C, B, BN and a silicon nitride.

* * * * *